June 7, 1966 L. SZTYBEL 3,255,409
CAPACITANCE TESTER FOR PERFORMING CAPACITANCE MEASUREMENTS
AND OPEN AND SHORT CIRCUIT TESTS
Filed Feb. 19, 1962 2 Sheets-Sheet 1

| TEST | CONTACTS OF SW. 30 CONNECTED |
|---|---|
| SHORT | a-h, d-e-f |
| CAPACITY | a-b, c-d, e-f |
| OPEN | f-g |

INVENTOR.
Leon Sztybel
BY
Silverman, Mullin & Cass
Attys.

INVENTOR.
Leon Sztybel
BY
Silverman, Mullin & Cass
Attys.

United States Patent Office 3,255,409
Patented June 7, 1966

3,255,409
CAPACITANCE TESTER FOR PERFORMING CAPACITANCE MEASUREMENTS AND OPEN AND SHORT CIRCUIT TESTS
Leon Sztybel, Brooklyn, N.Y., assignor to Eico Electronic Instrument Co. Inc., Long Island City, N.Y.
Filed Feb. 19, 1962, Ser. No. 174,054
2 Claims. (Cl. 324—60)

This invention relates in general to capacitance testers and in particular to in-circuit capacitance testers which are adapted to test the essential electrical characteristics of capacitors, without necessitating their removal from the circuit in which they are normally operative.

Capacitance testers have been known in the art for some time. Very accurate testers are not only expensive and bulky, but in general require that the capacitor under test be isolated from the circuit in which it is normally operative. There has long been a need for a capacitance tester which is economical, simple to operate, and which yields fairly accurate results without requiring removal of the capacitor under test from its normal circuit. The advantages of such a unit, especially from the serviceman's standpoint, may be readily appreciated.

The capacitance tester of the invention comprises a self-contained unit capable of measuring or testing three essential characteristics of a capacitor. These are the capacitance value itself, and the high frequency and low frequency impedance of the capacitor.

It should of course be realized that not all capacitors can be effectively tested in an in-circuit condition. For example, if the external parallel circuit impedance or resistance of the capacitor is small, it is extremely difficult, if not impossible, to measure the value (or high and low frequency impedance) of the capacitor without isolating it.

The present invention discloses means for obtaining relatively accurate in-circuit measurements of capacitors in the range of 0.1 to 50 microfarads (mfd.) provided that the resistance-capacitance product (RC product) of the capacitor under test and its externally connected parallel resistance is greater than a value of .6, in which RC product the capacitance is expressed in microfarads and the resistance is expressed in kilohms. The capacitance measurement is accomplished by a bridge circuit utilizing a known capacitor and a number of variable resistors. In attempting to cover such a range of capacitance measurements in an economical, in-circuit tester serious problems arise with respect to (1) loss of sensitivity of the bridge and (2) crowding of the RC balance control settings which makes accurate balance extremely difficult.

In the circuit of the invention, the RC balance control settings are rendered practical over substantially the entire range of RC products involved, and a decrease in sensitivity of the bridge circuit is avoided by utilizing two variable resistors which are selectively connected in series or in parallel with the known capacitor depending upon the value of the anticipated RC product of the capacitor under test. This feature will be discussed more fully hereinafter.

The capacitance tester of the invention incorporates an electron discharge device signal translation means and a selecting switch for selectively connecting thereto three individual input circuits for respectively performing a low frequency short circuit test, a high frequency open circuit test and a capacitance measurement. The output of the signal translation means is coupled to another electron discharge means for amplifying and yielding a visual indication of the presence of conduction current in the first signal translation means.

Accordingly, a principal object of this invention is to provide an in-circuit capacitance tester of improved accuracy and utility.

Another object of this invention is to provide an in-circuit capacitance tester of economical design for selectively performing a low frequency short circuit test, performing a high frequency open circuit test and measuring the value of the capacitor under test.

Another object of this invention is to provide an in-circuit capacitance tester utilizing a bridge circuit for measuring with a high degree of accuracy, capacitors having values from .1 to 50 mfd. and RC products of .6 millisecond or greater.

Still another object of this invention is to provide an in-circuit capacitance tester including a bridge circuit having a known capacitor selectively connectable in series and parallel with a pair of variable resistors for assuring a wide range of shunt resistance balance conditions.

A further object of this invention is to provide an in-circuit capacitance tester including an electron discharge device which is selectively operable as an amplifier, a null detector and a high frequency oscillator.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings.

Figure 1:
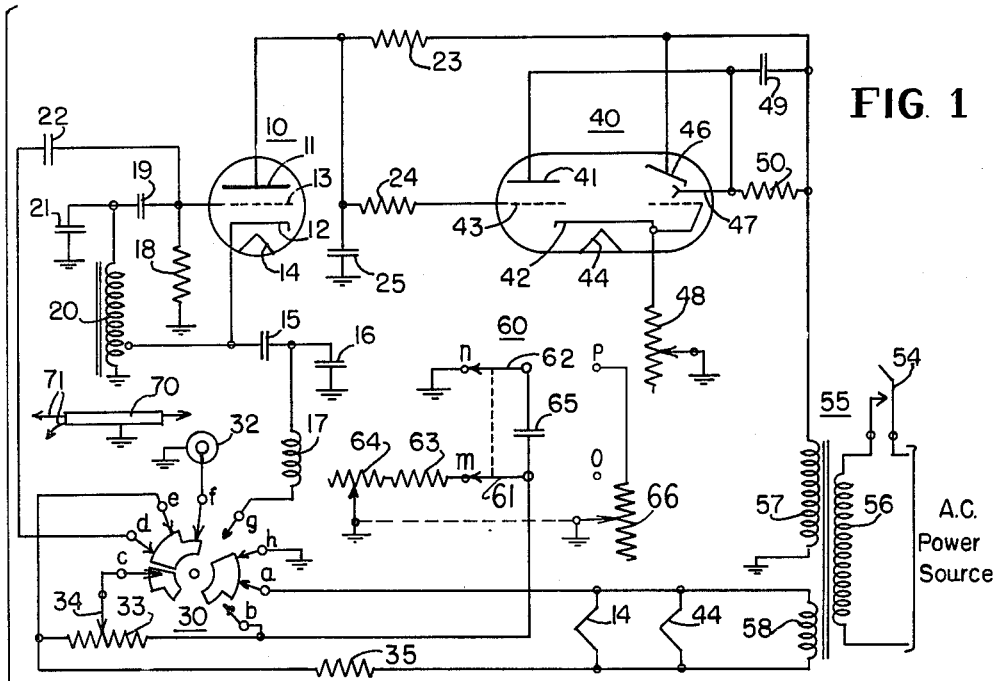
FIG. 1 is a schematic diagram of the capacitance tester of the invention.

Referring now to FIG. 1, there is shown a vacuum tube 10 having an anode 11, a cathode 12, a control grid 13 and a heater element 14. A resistor 18, which acts as part of a conventional grid leak bias circuit, is connected from control grid 13 to ground. An oscillatory input circuit comprising capacitors 15, 16, 19 and 21 and inductors 17 and 20 are utilized for operating vacuum tube 10 as a high frequency oscillator. This oscillatory input circuit will be described in more detail with reference to FIG. 4.

Anode 11 of vacuum tube 10 is supplied operating potential, through a load resistor 23, from the secondary winding 57 of a transformer 55. The primary winding 56 of this transformer is connected through a switch 54 to a source of ordinary 60 cycle alternating current potential (not shown). Winding 57 develops a higher voltage than that present across winding 56 and also provides operating potential, through a load resistor 50, for anode 41 of another vacuum tube 40.

Vacuum tube 40 has two separate sections in a common evacuated envelope. A cathode 42 and a heater element 44 are common to both tube sections. The left section of tube 40 includes anode 41, grid 43 and cathode 42 and comprises a triode amplifier. The right section of tube 40 includes an anode 46, cathode 42 and a ray control electrode 47. This section of tube 40 comprises a bar-type electron ray tube for yielding a visual indication of the potential difference existing between anode 46 and ray control electrode 47.

Cathode 42 is connected to ground through a variable resistor 48 which is manually variable to control the sensitivity of tube 40.

Resistor 24 is connected between grid 43 and anode 11. Anode 11 is connected to ground through a capacitor 25 which serves as a high frequency bypass. Variations in the anode current of tube 10 are communicated to the amplifier section of tube 40. It will be noted that the load resistor 50 for anode 41 is also connected to ray control electrode 47. Thus, variations in anode 41 current are communicated to the tuning eye portion of tube 40.

Transformer 55 has a low voltage secondary winding 58 which supplies heater elements 14 and 44 of tubes 10 and 40, respectively. A test selecting switch 30, having a series of stationary contacts a, b, c, d, e, f, g and h and three isolated conductive elements, is provided for selectively connecting various ones of the stationary contacts together in accordance with the position of the switch.

FIG. 1 includes a chart 67 indicating which of the stationary contacts of test switch 30 are connected together in each of the three test positions. Thus, in the "short" position, contacts a–h and d–e–f are respectively connected together. In the "capacity" position, contacts a–b, and c–d and e–f are respectively connected together. In the "open" position, contacts f–g are connected together.

A pair of input terminals, illustrated as a coaxial jack 32, are respectively connected to ground and to contact f of test switch 30. A coupling capacitor 22 is connected between grid 13 of vacuum tube 10 and contact d of test switch 30. Inductor 17 is connected to contact g of test switch 30. One side of winding 58 is connected, through a resistor 35, to contact e of test switch 30, and through a resistor 33, to contact b. Resistor 33 has a movable tap 34, connected to contact c, and comprises the two ratio arms of the bridge circuit which will be described more fully with reference to FIG. 3. The other end of winding 58 is connected to contact a. Contact h is grounded.

Another portion of the bridge circuit, to be more fully described with reference to FIG. 3, includes a two-pole, two-position RC product range switch 60. The poles are labeled 61 and 62 respectively, and a capacitor 65 of known value is connected therebetween. Range switch 60 has four contacts m, n, o and p. A fixed resistor 63 and a variable resistor 64 are serially connected between contact m and ground. A variable resistor 66 is connected between contact p and ground. The movable members of both these variable resistors are ganged together, as indicated by the dashed line joining these parts, and together these variable resistors constitute the RC balance control. Contact n is grounded. It can be seen that, with range switch 60 in its contact m–n position, capacitor 65 is connected in parallel with resistor 63 and variable resistance 64. With range switch 60 in its o–p position, capacitor 65 is connected in series with variable resistor 66.

A suitable connecting cable 70, having a pair of connecting devices 71 for connecting across the terminals of the capacitor to be tested, is provided for secure engagement with input jack 32. Connecting devices 71 may conveniently be small "alligator" type clips. Cable 70 has characteristics which will be more fully described with reference to FIG. 4.

Figure 2:
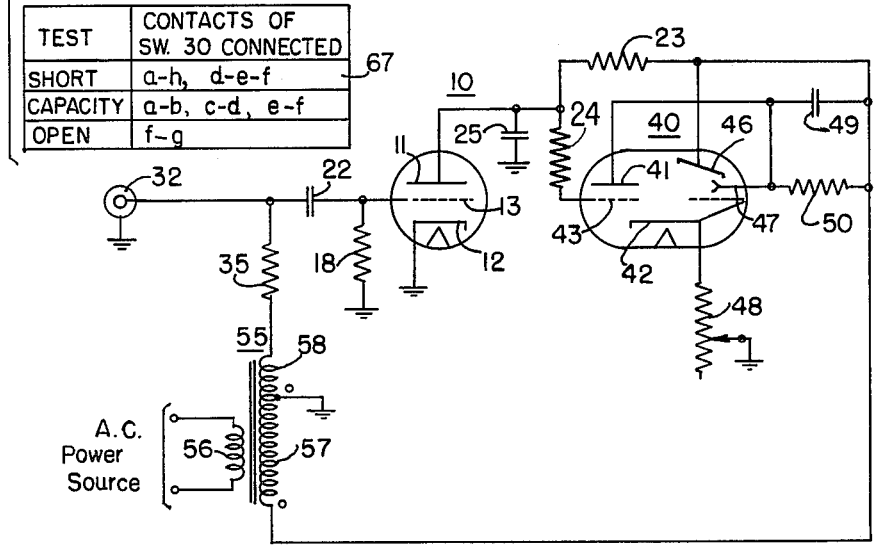
FIG. 2 is a simplified schematic diagram of the capacitance tester of FIG. 1 when operating in the "short test" position.
Figure 3:
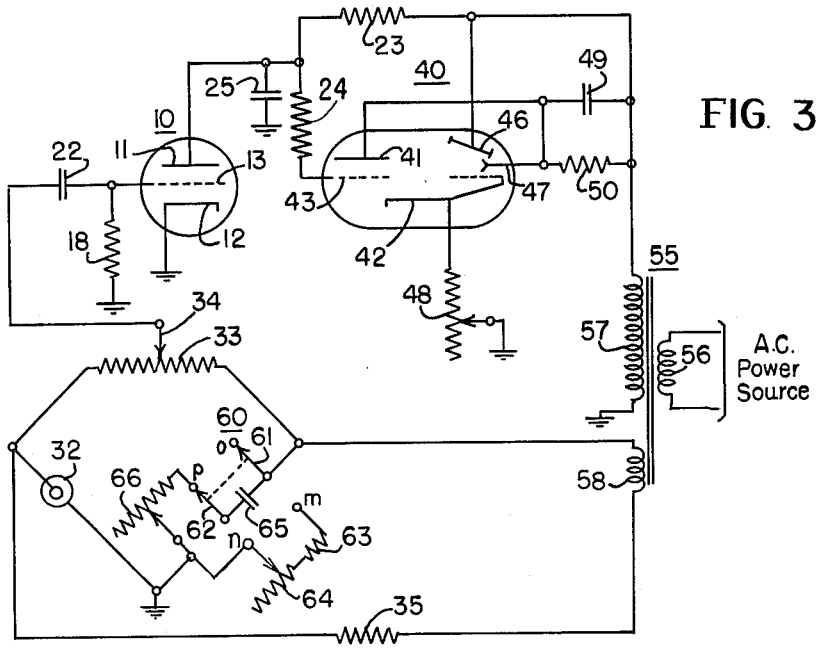
FIG. 3 is a simplified schematic diagram of the capacitance tester of FIG. 1 when operating in the "capacity test" position.
Figure 4:
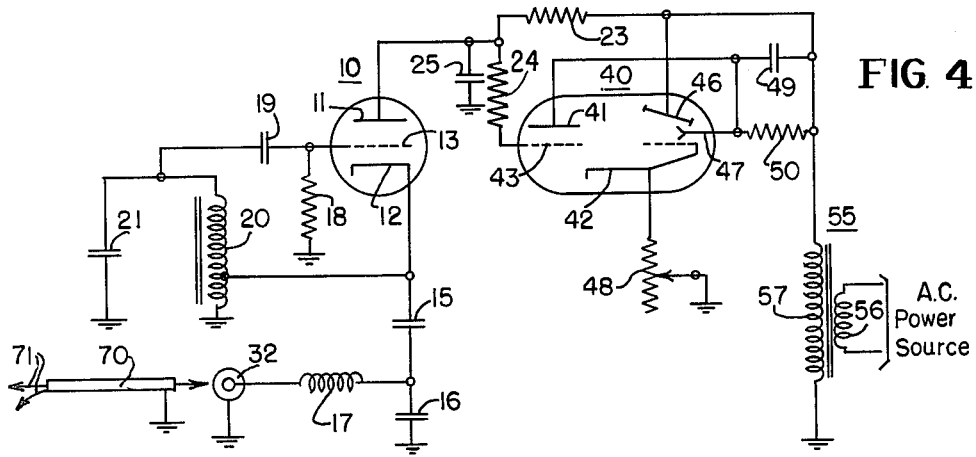
FIG. 4 is a simplified schematic diagram of the capacitance tester of FIG. 1 when operating in the "open test" position.

To facilitate understanding of the circuit and the invention, the partial schematic diagrams of FIGS. 2–4 are shown. These diagrams are somewhat simplified and represent the circuits attained by placing test selecting switch 30 in its short, capacity, and open positions, respectively. When test switch 30 is in its short position, the diagram of FIG. 2 results.

In FIG. 2, the secondary windings 57 and 58 of transformer 55 each have one lead connected to ground. The tiny dot adjacent a respective end of each of these windings indicates the instantaneous phase of the low frequency alternating current potential developed thereacross. Thus, as shown, the ungrounded end of winding 58 has a potential which is 180° out of phase with the ungrounded end of winding 57. In the actual circuit, the approximate voltage across winding 58 is 6.3 volts (60 cycle A.C.) and the approximate voltage across winding 57 is 330 volts (60 cycle A.C.). The oscillatory input circuit connection to grid 13 of vacuum tube 10 is not shown since it is of no effect in this circuit. It should be noted, however, that while cathode 12 is indicated as being connected to ground in FIG. 2, it actually is connected through the lower portion of tapped inductor 20, which has negligible impedance at this low frequency.

Anode 10 is fed an alternating current voltage from winding 57 and grid 13 is fed a small alternating current voltage in an opposite phase from winding 58. Thus, when the anode voltage is positive, the grid voltage is negative and when the grid voltage is positive, the anode voltage is negative. Hence, very little current flows, in tube 10. Consequently, the voltage drop across load resistor 23 is small and substantially the full potential of winding 57 is applied to grid 43 of tube 40. It should be noted that the grid and anode voltages of tube 40 are not in phase opposition and hence substantial current flows between anode 41 and cathode 42 of tube 40. Thus, a large voltage drop is developed across load resistor 50 and a large potential difference appears across anode 46 and ray control electrode 47. Under these conditions, the visual indicator tube bars are spread apart, or in terms of the art, the tuning eye is open. Before performing any tests, variable resistor 48 is adjusted to cause closure of the tuning eye with the external connecting devices 71 connected together and test selecting switch in the short position.

The above circuit operation obtains whenever the external impedance connected across input jack 32 is approximately ten ohms or more. If the connected impedance across input jack 32 is less than ten ohms, the alternating current potential at grid 13 is smaller, since a voltage drop is developed across resistor 35 in accordance with the current flow through the external impedance. Remembering again that the grid potential and the anode potential are in phase opposition, a smaller potential at grid 13 gives rise to a larger conduction current in tube 10. With an increase in anode current, an increased voltage drop occurs across load resistor 23 and consequently grid 43 of tube 40 becomes negative with respect to anode 41. Thus, the conduction current between anode 41 and cathode 42 decreases and the potential drop across load resistor 50 decreases. The potential difference between anode 46 and ray control electrode 47 also decreases and the tuning eye tends to close. It can be seen then that when performing the short test an open tuning eye indicates a capacitor with acceptable low frequency impedance and a closed tuning eye indicates a capacitor with unacceptable low frequency impedance, bearing in mind that if tests are performed for a capacitor in a circuit, the shunting elements of the circuit will affect the resultant impedance.

FIG. 3 depicts a simplified schematic diagram of the circuit of FIG. 1 when test switch 30 is in the capacity position. Once again, the oscillatory input circuit is not shown for the sake of simplicity. The circuit has been rearranged somewhat to readily indicate the familiar form of the bridge circuit. The capacitor under test comprises one arm of the bridge since it is connected across the terminals of input jack 32. Another arm of the bridge includes capacitor 65 (of known value), range switch 60 and variable resistors 64 and 66, which together comprise the RC balance control. The other two arms (ratio arms) of the bridge comprise the portions of resistor 33 between movable tap 34 and the respective ends. Movable tap 34 constitutes one corner of the bridge and is connected through capacitor 22 to grid 13 of tube 10. The corner of the bridge opposite movable tap 34 is grounded and consequently tube 10 serves as a sensitive null condition detector. Low voltage winding 58 is connected across the opposite pair of corners of the bridge and supplies a low voltage, low frequency, alternating current potential thereto.

Bearing in mind that the capacitor under test must have an RC product greater than .6 millisecond, it will be appreciated that the bridge must be capable of a similar RC product range, taking into consideration the multiplicative effect of the ratio arms. Further, the above must be accomplished without a decrease in sensitivity of the bridge circuit and without crowding the RC balance control range settings. This is essential since good alternating current balance demands a sharp resistive balance as well as a sharp capacitance balance. In the bridge circuit under consideration, the equivalent dissipation factors for the RC product range involved have been utilized to determine the values of resistor 63 and variable resistors 64 and 66 with a view to obviating the two disadvantages mentioned above. The RC balance control comprises variable resistors 64 and 66, which are ganged together and calibrated in RC product. Two overlapping ranges of RC product are used, which ranges are selected by range switch 60. The maximum dissipation factor attainable is determined by the value of capacitor 65 and resistor 63. The minimum dissipation factor is, of course, zero. Calibration of both RC product ranges is in the numerical value of the RC product corresponding to the actual dissipation factors attained. The range switch 60 is marked .6 to 10.5 for the m-n position and 7 to infinity for the o-p position. There are two calibrated scales on the common dial indicator (not shown) of the RC balance control, one covering an RC product range of .6 to 10.5 milliseconds and the other covering an RC product range of 7 to infinity. These scales are calibrated in RC product corresponding to the actual dissipation factors attained regardless of the position of range switch 60. In the case of the high RC product range (switch 60 in its o-p position and capacitor 65 in series with variable resistor 66) the dissipation factor is calculated for the parallel circuit which is the electrical equivalent of the series connected capacitor 65 and variable resistor 66. The total RC balance control range has thus been divided into two overlapping ranges which are instrumental in allowing accurate setting of the control; this being essential to good bridge balance. Without this feature, it would prove either more costly or very difficult to achieve good balance. Thus, for the high dissipation factor case (low RC product) range switch 60 is placed in the *m-n* position, placing capacitor 65 in parallel with resistor 63 and variable resistor 64. For the low dissipation factor case (high RC product) switch 60 is used in the *o-p* position, placing capacitor 65 in series with variable resistor 66.

In measuring a capacitor, an initial estimate is made of the RC product of it and its associated external impedance. Switch 60 is placed in the position corresponding to the range in which this calculated RC product falls. It is not necessary to know the shunting resistance for even without this knowledge, a proper balance can be achieved without difficulty. In this case the switch 60 is placed in the position "7-INF" and the "RC balance" control in the position "INF." Balance is thereafter achieved by alternately adjusting movable tap 34 (the capacitance dial) and the RC balance control (movable taps of variable resistors 64 and 66) until maximum closure of the tuning eye is obtained. At a null condition, grid 13 and cathode 12 are at the same potential and a large anode current flows in tube 10. As previously described, this closes the tuning eye. For a non zero voltage from the bridge, grid 13 goes negative and the current in tube 10 decreases causing the tuning eye to open somewhat.

With test selecting switch 30 in the open position, the simplified circuit of FIG. 4 is obtained. In FIG. 4, it will be seen that any conduction current flowing in tube 10 must traverse the lower portion of inductor 20, which with capacitor 21 comprises a tuned tank circuit. With the exception of capacitors 15, 16, and inductor 17, tube 10 acts as a simple Hartley oscillator. Whenever oscillation occurs in the tank circuit, grid 13 is negative and the current in tube 10 is small. Consequently, as described previously, the tuning eye indicator opens. In the absence of oscillation, grid 13 is at substantially the same potential as cathode 12 and the current in tube 10 is large with consequent closure of the tuning eye. The presence of oscillation in the circuit is dependent upon the impedance connected across clips 71 of connecting cable 70. The connecting cable, capacitors 15 and 16 and inductor 17 comprise a quarter wave length line for the normal frequency of oscillation of this circuit, which is approximately nineteen megacycles. If an open circuited capacitor is connected across clips 71, it represents a short circuit between cathode 12 and ground, and the lower portion of inductor 20 is effectively shorted. Thus, oscillations in the tank circuit are suppressed with an impedance of appreciable value connected across clips 71. Conversely, with a low impedance connected across clips 71, the quarter wave length line presents a high impedance at the input and oscillation occurs. When conducting the open test, an open tuning eye indicates a capacitor with an acceptable high frequency impedance, and a closed tuning eye indicates a capacitor with unacceptable high frequency impedance, or an open circuit.

What has been described is a simple, economical in-circuit capacitance tester for yielding accurate indications of the electrical condition of a capacitor.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. A capacitance tester for determining the electrical condition of an unknown capacitance without disassociating the same from its operating environment comprising:

an amplifier means including an input section and an output section, said amplifying means having a first state and a second state, said amplifying means conducting substantially more current in one of said states than in the other of the states;

a pair of input terminals for connecting said unknown capacitance thereacross;

a first circuit for testing the high-frequency impedance of said unknown capacitance;

a second circuit for determining the value of said unknown capacitance provided the resistance-capacitance product of said unknown capacitance and the parallel resistance across said unknown capacitance is greater than a predetermined minimum value;

a third circuit for testing the low-frequency impedance of said unknown capacitance;

a test switch having a first position, a second position and a third position for operatively associating said first, second and third circuits respectively between said input terminals and said amplifying means;

said first circuit including an oscillator circuit comprising a tuned tank circuit connected to the input circuit of said amplifying means, said tuned tank circuit including an inductive means and a capacitive means dimensioned to oscillate at a particular high frequency, the output voltage of said tank circuit when oscillating providing a biasing voltage to maintain said amplifying means in one of said states when said test switch is in said first position, said tank circuit when not oscillating removing said biasing voltage to maintain said amplifying means in the other of said states when said test switch is in said first position, a connecting cable of substantially a quarter wave length with respect to said oscillating frequency of said tank circuit included in said first circuit and connecting said unknown capacitance to said tank circuit when said test switch is in said first position, said connecting cable reflecting a substantially high impedance to said tank circuit and having substantially no effect thereupon when the high frequency impedance of said unknown capacitance is below a predetermined value, said connecting cable reflecting a substantially low impedance to said tank circuit to stop the same from oscillating when the high frequency impedance of said unknown capacitance is above said predetermined value to cause said amplifying means to switch states and thereby indicate a high impedance for said unknown capacitance at said high frequency;

said second circuit means including a bridge circuit having a first arm, a second arm, a third arm and a fourth arm, said first arm including a known value capacitor, a first variable resistance means, a second variable resistance means and a resistnce switch mens having a first position and a second position to selectively associate said first resistance means and said second resistance means with said known value capacitor, in said first position of said resistance switch means said first variable resistance means being in parallel with said known value capacitor to provide a high dissipation factor, in said second operative position of said resistance switch means said second variable resistance means being in series with said known value capacitor to provide a low dissipation factor, said second arm including said unknown capacitance when said test switch is in said second position, a first and second impedance means included respectively in the third and fourth arms, at least one of said impedance means comprising a third variable resistance means, a signal source generating a particular frequency coupled to said bridge circuit when said test switch is in said second position, said arms being associated with each other to permit the impedance of said bridge to be balanced at said particular frequency, said first variable resistance means in parallel with said known capacitor cooperating with said third variable resistance means to determine said unknown capacitance when the product of said unknown capacitance and said parallel resistance is a low value with respect to said predetermined minimum value of the resistance-capacitance product, said second variable resistance means in series with said known capacitor cooperating with said third variable resistance means to determine said unknown capacitance when the product of said unknown capacitance and said unknown resistance is a high value with respect to said predetermined minimum value of the resistance-capacitance product, said bridge circuit being connected to the input section of said amplifying means to provide a current variation when said bridge is at a null whereupon said unknown capacitance may be determined; and said third circuit means including a low frequency signal source having a first signal and a second signal in phase opposition to each other, said first signal being coupled to said output section of said amplifying means, said second signal being coupled to said input section of said amplifying means and said unknown capacitance being connected to said input section when said test switch is in said third position whereby the low-frequency impedance of said unknown capacitance determines the current conduction of said amplifying means, the cooperation of said first and second signals maintaining said amplifying means in one of said states when the low-frequency impedance is above a predetermined value, the magnitude of said second signal being substantially decreased at said input section of said amplifying means when said low frequency impedance of said unknown capacitance is below said predetermined value and causing said amplifying means to go from one of said states to the other of said states and thereby indicating a low value of low-frequency impedance for said unknown capacitance.

2. A capacitance tester for determining the electrical condition of an unknown capacitance comprising:

an amplifier means including an input section and an output section, said amplifying means having a first state and a second state, said amplifying means conducting substantially more current in one of said states than in the other of said states;

a pair of input terminals for connecting said unknown capacitance thereacross;

a first circuit for testing the high-frequency impedance of said unknown capacitance;

a second circuit for determining the value of said unknown capacitance provided the resistance-capacitance product of said unknown capacitance and the parallel resistance across said unknown capacitance is greater than a predetermined minimum value;

a test switch having a first position and a second position for operatively associating said first and second circuits respectively between said input terminals and said amplifying means;

said first circuit including an oscillator circuit comprising a tuned tank circuit connected to the input circuit of said amplifying means, said tuned tank circuit including an inductive means and a capacitive means dimensioned to oscillate at a particular high frequency, the output voltage of said tank circuit when oscillating providing a biasing voltage to maintain said amplifying means in one of said states when said test switch is in said first position, said tank circuit when not oscillating removing said biasing voltage to maintain said amplifying means in the other of said states when said test switch is in said first position, a connecting cable of substantially a quarter wave length with respect to said oscillating frequency of said tank circuit included in said first circuit and connecting said unknown capacitance to said tank circuit when said test switch is in said first position, said connecting cable reflecting a substantially high impedance to said tank circuit and having substantially no effect thereupon when the high frequency impedance of said unknown capacitance is below a predetermined value, said connecting cable reflecting a substantially low impedance to said tank circuit to stop the same from oscillating when the high frequency impedance of said unknown capacitance is above said predetermined value to cause said amplifying means to switch states and thereby indicate a high impedance for said unknown capacitance at said high frequency; and said second circuit means including a bridge circuit having a first arm, a second arm, a third arm and a fourth arm, said first arm including a known value capacitor, a first variable resistance means, a second variable resistance means and a resistance switch means having a first position and a second position to selectively associate said first resistance means and said second resistance means with said known value capacitor, in said first position of said resistance switch means said first variable resistance means being in parallel with said known value capacitor to provide a high dissipation factor, in said second position of said resistance switch means said second variable resistance means being in series with said known value capacitor to provide a low dissipation factor, said second arm including said unknown capacitance when said test switch is in said second position, a first and second impedance means included respectively in the third and fourth arms, at least one of said impedance means comprising a third variable resistance means, a signal source generating a particular frequency coupled to said bridge circuit when said test switch is in said second position, said arms being associated with each other to permit the impedance of said bridge to be balanced at said particular frequency, said first variable resistance means in parallel with said known capacitor cooperating with said third variable resistance means to determine said unknown capacitance when the product of said unknown capacitance and said parallel resistance is a low value with respect to said predetermined minimum value of the resistance-capacitance product, said second variable resistance means in series with and known capacitor cooperating with said third variable resistance means to determine said unknown capacitance when the product of said unknown capacitance and said unknown resistance is a high value with respect to said predetermined minimum value of the resistance-capacitance product, said bridge circuit being connected to the input section of said amplifying means to provide a current variation when said bridge is at a null whereupon said unknown capacitance may be determined.

References Cited by the Examiner

"Capacitor-Resistor Analyzer," Radio-Electronics, volume 26, No. 6, June 1955, pages 72–74.

"A New Universal Impedance Bridge," General Radio Experimenter, volume 33, No. 3, March 1959, pages 3–9, pages 3–5 relied on.

"Quick-Check Capacitor Testers," Radio and Television News, volume 54, No. 3, September 1955, pages 118–120.

"Workshop R-C Bridge," Wireless World, volume 61, No. 2, February 1955, pages 80–82.

WALTER L. CARLSON, *Primary Examiner.*

FREDERICK M. STRADER, *Examiner.*

D. R. GREEN, E. E. KUBASIEWICZ,
*Assistant Examiners.*